US008180356B2

(12) United States Patent
Hu

(10) Patent No.: US 8,180,356 B2
(45) Date of Patent: May 15, 2012

(54) METHOD FOR NOTIFYING CHANGES OF CELL INFORMATION IN MULTIMEDIA BROADCAST/MULTICAST SERVICE

(75) Inventor: Hao Hu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 589 days.

(21) Appl. No.: 11/479,854

(22) Filed: Jun. 29, 2006

(65) Prior Publication Data

US 2006/0245386 A1 Nov. 2, 2006

Related U.S. Application Data

(63) Continuation of application No. PCT/CN2005/01633, filed on Sep. 30, 2005.

(30) Foreign Application Priority Data

Sep. 30, 2004 (CN) .......................... 2004 1 0085408

(51) Int. Cl.
*H04W 72/00* (2009.01)
*H04W 36/00* (2009.01)
*H04W 4/00* (2009.01)
(52) U.S. Cl. ......... 455/450; 455/436; 455/442; 370/331
(58) Field of Classification Search .................. 455/435, 455/442, 450; 370/331
See application file for complete search history.

(56) References Cited

U.S. PATENT DOCUMENTS

| 5,404,355 A | 4/1995 | Raith |
| 6,161,015 A | 12/2000 | Birchler |
| 6,628,946 B1 * | 9/2003 | Wiberg et al. ................ 455/434 |
| 2003/0231612 A1 * | 12/2003 | Kim et al. ..................... 370/342 |
| 2004/0022218 A1 | 2/2004 | Kim et al. |
| 2004/0192360 A1 * | 9/2004 | Tsai et al. ..................... 455/501 |
| 2005/0063339 A1 * | 3/2005 | Jeong et al. ................... 370/331 |
| 2007/0275734 A1 * | 11/2007 | Gaal et al. .................. 455/456.6 |

FOREIGN PATENT DOCUMENTS

| CN | 1303575 A | 7/2001 |
| CN | 1496139 A | 5/2004 |
| CN | 1518255 A | 8/2004 |

(Continued)

OTHER PUBLICATIONS

3GPP TS 25.346 V6.2.0 (Sep. 2004) 3rd Generation Partnershit Project; Technical Specification Group Radio Access Network; Introduction of the Multimedia Broadcast Multicast Service (MBMS) in the Radio Access Network (RAN) Stage 2 (Release 6).*

(Continued)

*Primary Examiner* — Dwayne Bost
*Assistant Examiner* — Michael Mapa
(74) *Attorney, Agent, or Firm* — Huawei Technologies Co., Ltd.

(57) ABSTRACT

The present invention discloses a method for notifying changes of cell information in MBMS. The method comprises a procedure of the change in cell information of an adjacent cell triggering a UE demodulating the cell information: acquires cell information of adjacent cell in realtime and determines whether the cell information has changed, if changed, carries service information in an instruction message of the control channel and notifies a UE of a change in cell information; otherwise, repeats this step. By means of the method according to the present invention, it is ensured that the UE has correct cell information at any time, even when moving to the border of two adjacent cells.

12 Claims, 5 Drawing Sheets

FOREIGN PATENT DOCUMENTS

| | | | |
|---|---|---|---|
| JP | 2003500950 | T | 1/2003 |
| JP | 2004166209 | A | 6/2004 |
| WO | WO 00/72609 | A1 | 11/2000 |
| WO | WO 03/063418 | A1 | 7/2003 |
| WO | 03107568 | A1 | 12/2003 |
| WO | 2004064342 | A1 | 7/2004 |
| WO | 2004071117 | A1 | 8/2004 |

OTHER PUBLICATIONS

European Office action dated Jul. 2, 2007, for EP 05 792 170.2, in the name of Huawei Technologies Co., Ltd.

International Search Report and Written Opinion of corresponding PCT Patent Application No. PCT/CN2005/001633, mailed on Nov. 24, 2005, total 7 pages.

3GPP TS 25.346 V6.1.0: "3rd Generation Partnership Project; Technical Specification Group Radio Access Network; Introduction of the Multimedia Broadcast Multicast Service (MBMS) in the Radio Access Network (RAN);Stage 2 (Release 6)",dated Jun. 2004, total 51 pages.

3GPP TS 25.331 V3.20.0 : "3rd Generation Partnership Project; Technical Specification Group Radio Access Network; Radio Resource Control (RRC) protocol specification(Release 1999)",dated Sep. 2004, total 879 pages.

3rd Generation Partnership Project:; Technical Specification Group Radio Access Network; Introduction of the Multimedia Broadcast Multicast Service (MBMS) in the Radio Access Network (RAN); Stage 2; Release 6; 3GPP TS 25.346 vol. 6.2.0, Sep. 23, 2004, XP002421865.

European Search Report dated Mar. 9, 2007, for PCT/CN2005/001633, in the name of Huawei Technologies Co., Ltd.

* cited by examiner

METHOD FOR NOTIFYING CHANGES OF CELL INFORMATION IN MULTIMEDIA BROADCAST/MULTICAST SERVICE

CROSS-REFERENCE TO RELATED PATENT APPLICATION

This application is a Continuation Application of International Application Number PCT/CN2005/001633, filed on Sep. 30, 2005, which claims priority of Chinese Patent Application Number 200410085408.X, filed on Sep. 30, 2004.

FIELD OF THE INVENTION

The present invention relates to the method for the network side sending notices in a Multimedia Broadcast/Multicast Service (MBMS), and more particularly, to a method for notifying changes of cell information in MBMS.

BACKGROUND OF THE INVENTION

Multicast and broadcast are techniques for transferring data from one source to multiple destinations. In a conventional mobile network, the Cell Broadcast Service (CBS) allows low bit-rate data to be transferred to all users via a shared broadcasting channel of a cell, which is categorized as a message service.

At present, demand for mobile communications has gone beyond telephone and message services. Along with the rapid development of the Internet, there emerge a great deal of multimedia services, some applications of which require that multiple users be able to receive the same data at the same time, e.g. video-on-demand (VOD), telecast, video conference, network-based education, and interactive video games. Compared with conventional data, these multimedia services are featured with large data flow, long time duration, and high sensitivity to time delay. In prior art, IP multicast is only applicable to fixed IP networks rather than mobile networks, for mobile networks have special network architectures, functional entities, and wireless interfaces, which are all different from those of a fixed IP network.

In order to make efficient use of mobile networks resources, the WCDMA/GSM global standardization organization, 3GPP, has put forward MBMS, which is designed to provide point-to-multipoint services of transferring data from one source to multiple users in mobile networks so as to share network resources and improve the utility rate thereof, especially the utility rate of wireless interface resources. MBMS defined by 3GPP can implement not only multicast and broadcast of plain text and low-rate messages, but also multicast and broadcast of high-rate multimedia services, which is no doubt in the trend of future development of mobile data transmission.

In order to support MBMS, a new mobile network functional entity, Broadcast Multicast-Service Center (BM-SC), is added to mobile networks. BM-SC is the entrance of content providers and used for authorizing and initiating an MBMS bearer service as well as delivering MBMS transmissions according to the scheduled timetable. In addition, functional entities, such as user equipment (UE), Universal Mobile Telecommunications System (UMTS) Terrestrial Radio Access Network (UTRAN), Global System for Mobile communication (GSM) Enhanced Data rates for GSM Evolution (EDGE) Radio Access Network (GERAN), Serving General Packet Radio Service (GPRS) Support Node (SGSN), and Gateway GPRS Support Node (GGSN) are enhanced by absorbing relevant functions of MBMS.

Such network architecture is shown in FIG. 1, which is a schematic diagram illustrating a radio network architecture supporting multicast/broadcast services, wherein, BM-SC is connected with the GGSN via the interface Gmb or Gi, and one BM-SC may be connected with multiple GGSN; GGSN is connected with the SGSN via the interface Gn/Gp, and one GGSN may be connected with multiple SGSN; SGSN may be connected via the interface Iu with UTRAN, which is in turn connected with UE via the interface Uu; SGSN may also connected via the interface Iu/Gb with GERAN, which is in turn connected with UE via the interface Um.

MBMS includes the multicast mode and the broadcast mode, and the difference between the two modes lies in that in the multicast mode, relevant information only to be sent to the users who have subscribed to the information while in the broadcast mode, information to be sent to all users of the radio network. In the multicast mode, it is required that a user subscribe to an appropriate multicast group, the service be activated, and relevant billing information be generated. As there is difference between the multicast mode and the broadcast mode in service demand, the service procedures thereof are different.

There are two modes of MBMS data transmission between UTRAN and UE: the point-to-multipoint (PTM) mode and point-to-point (PTP) mode. In the PTM mode, the same data are sent via the MBMS PTM traffic channel (MTCH), and may be received by all UE that have joined in the multicast service or are interested in the broadcast service. In the PTP mode, data are sent via a dedicated traffic channel (DTCH), and can be received only by a corresponding UE.

The whole process for UE to receive a certain MBMS broadcast service is shown in FIG. 2a, which comprises the phases of Service Announcement, Session Start, MBMS Notification, Data Transfer, and Session Stop.

Here, in the Service Announcement phase, the BM-SC informs the UEs about forthcoming user services.

In the Session Start phase, the BM-SC is ready to send data and triggers the bearer resource establishment in the core network (CN) and the UTRAN.

In the MBMS Notification phase, the UEs are informed about forthcoming MBMS broadcast session.

In the Data Transfer phase, the BM-SC transfers MBMS data to the UEs through the bearer resources established in the Session Start phase.

In the Session Stop phase, the bearer resources established in the Session Start phase is released.

In a broadcast service, each MBMS service node stores the MBMS bearer context, and the MBMS bearer context is activated in the Session Start phase and deactivated in the Session Stop phase.

The whole process for UE to receive a certain MBMS multicast service is shown in FIG. 2b, which comprises the phases of Subscription, Service Announcement, Joining, Session Start, MBMS Notification, Data Transfer, Session Stop, and Leaving.

Here, in the Subscription phase, the user subscribes to the desired MBMS services in advance.

In the Service Announcement phase, the BM-SC informs the user about forthcoming user services.

The Joining phase is the MBMS multicast service activation phase. In the Joining phase, the UE indicates to the network that it wants to become a member of the current multicast group and receives the multicast data of the specific MBMS bearer service. An MBMS UE context containing the information of UE joining the multicast group is created in both the network and the UE during the Joining phase.

In the Session Start phase, the BM-SC is ready to send data and triggers the bearer resource establishment in the CN and the UTRAN.

In the MBMS Notification phase, the UEs are informed about forthcoming MBMS multicast session.

In the Data Transfer phase, the BM-SC transfers MBMS data to the UEs through the bearer resources established in the Session Start phase.

In the Session Stop phase, the bearer resources established in the Session Start phase is released.

The Leaving is the process by which a subscriber leaves a multicast group, i.e. the user no longer wants to receive multicast data. The corresponding MBMS UE context is deleted during the Leaving phase.

In the procedures of MBMS, the cell information that the network side sends to the UEs does not remain unchanged but changes along with the changes of service, e.g. such cell information as the radio bearer (RB) information that the network side sends to the UEs and the services currently provided by the network side may change. The procedure by which the network side sends the UEs cell information at present is hereinafter described by taking the procedure of the network side sending the UEs the RB information as an example.

When the access network establishes radio bearer resources, the BSC/RNC at the network side will notify the UE of the RB information of the MBMS service. The RB information includes radio bearer configuration information (e.g. Packet Data Convergence Protocol (PDCP)) and radio bearer mapping information (e.g. Radio Link Control (RLC)), as well as configuration information of the transfer channel and physical channel.

If there is change in the RB information of the MBMS that is to be or being transferred in the cell, the network side will instruct the UEs to receive the changed RB information. The information instruction that notifies the UEs of the change in RB of the local cell is transferred in the MBMS MODIFIED SERVICES INFORMATION (MMSD) message. According to the action instructed by this message, the UEs further receive the RB information. Both the MMSI message and the RB information are transferred via the MBMS Control CHannel (MCCH).

The RB information that the network side sends via the MCCH to the UEs, however, comprises only the RB of the local cell.

As specified in the protocol, the procedure at present for the network side to notify the UEs of the RB parameters of MBMS service is carried out in the following two situations:

1. A UE has joined an MBMS service that the local cell has not yet provided:

In this case, no matter which state the UE is in (either Idle state or Radio Resource Control (RRC) connected state), it will monitor the MBMS notification Indicator CHannel (MICH);

The network side can obtain the RB information of adjacent cells via SGSN, and may adjust the RB information of the local cell according to the need of service.

When the RB information bearing the service in the local cell changes, the network side indicates the change of the service in MICH. When learning from MICH that the service to its concern has changed, the UE will further demodulate the RB information message carried in the notice of RB information change of the service to acquiring the RB information of the changed service, wherein the notice of RB information change of the service may be obtained from the MMSI message in MCCH.

2. The UE is receiving the MBMS service:

In this case, no matter which state the UE is in, it will receive periodically the signal of the MCCH;

The BSC/RNC can obtain the RB information of adjacent cells via SGSN. The network side may adjust the RB information of the local cell according to the need of service.

When the RB information bearing the service of the local cell changes, the network side indicates the change of the service in the MMSI message in MCCH. While receiving the MBMS service, if obtaining the notice of RB information change of the service from the MMSI message in MCCH, the UE will further demodulate the RB information message borne by the corresponding MCCH so as to acquire the RB information after the change of the service.

It can be seen from the foregoing procedures in the prior art that, at present, only when the RB information of the local cell changes will the network side notify the UEs of the change of the RB information via MICH or the MMSI message in MCCH, i.e. in the prior art, only the change of the RB information of the local cell will trigger the UEs demodulating the RB information.

As the specific situation in an adjacent cell is likely to be different, and the types of services provided in a cell may be different as well, the RB information of adjacent cells is probably different. According to the existing protocol, however, the change in RB information of the service in an adjacent cell is not reflected in the MMSI message. In another word, if the RB information of an MBMS service in the local cell does not change but the RB information in an adjacent cell changes, the UEs in the local cell have no way of being notified of the change of the RB information in the adjacent cell.

When a UE is receiving an MBMS service and has moved to the border of two cells, it is possible for the UE to perform the selective/soft merging function for the service at the border of two adjacent cells. The selective merging is to compare the information of the same service received from two adjacent cells at the RLC layer and select the data with better quality. The soft merging is the same as the soft merging function in the existing WCDMA system, which is not to be described in detail herein. In this scenario, therefore, if the UE has not updated the saved RB information along with the updating of the RB information in the adjacent cell, leading to an error in the RB information, the UE will not be able to receive the information of the same service from the adjacent cell and accordingly not be able to perform the merging function.

Likewise, as to other types of cell information, it is only possible in the prior art that the UEs are notified of the change of cell information in the local cell via MICH or MCCH. If the information of adjacent cells changes but the information of the local cell does not change, the UEs will not be notified. As a result, when a UE moves to the border of two adjacent cells, it is likely that the UE is not be able to perform the corresponding functions due to the error in the cell information.

SUMMARY OF THE INVENTION

The present invention provides a method for notifying changes of cell information in MBMS, ensuring that the cell information is correct when a UE moves to the border of two adjacent cells.

The method for notifying changes of cell information in multimedia broadcast/multicast service (MBMS) comprises a procedure of change in adjacent cell information triggering UE demodulating cell information: acquires cell information of adjacent cell in realtime and determining whether the cell information has changed, if changed, carries service information in an instruction message of a control channel and notifying a user equipment (UE) of a change in the cell information of adjacent cell; otherwise, repeats this step.

It can be seen from the above solution that, with the method for notifying the change in cell information in an MBMS service in accordance with embodiments of the present invention, the UE is notified not only when there is change in the cell information of the local cell but when there is change in the cell information of the adjacent cell. Therefore, the method is able to ensure that the cell information remains correct in the UE at any time, even when the UE moves to the border of two adjacent cells.

DETAILED DESCRIPTION OF EMBODIMENTS

In order to make clearer the object, solution, and merits of this invention, a further description in detail is hereinafter given to this invention with reference to the accompanying drawings and two embodiments.

In accordance with the method of this invention for notifying changes of cell information in MBMS, a UE will be notified of the change of cell information of a service via MICH and MCCH when only the cell information related with the service in the local cell changes, or only the cell information related with the service in the adjacent cell changes, or the cell information related with the service in the local cell and that in the adjacent cell both change, i.e. when any of the above situations occurs.

There is much cell information related with MBMS, e.g. the RB information sent to UEs by the network side, the services currently provided by the network side, etc. Two specific embodiments in which the network side sends RB information to UEs are hereinafter presented to give a detailed description to this invention.

Embodiment 1

In this embodiment, a processing program is added to the BSC/RNC at the network side such that BSC/RNC is also able to trigger the UE demodulating the RB information in case the RB information of the adjacent cell changes. In this embodiment, the procedure in the prior art of triggering the UE demodulating the RB information in case the RB information of the local cell changes is reserved without modification, which is not to be described herein.

Figure 1:
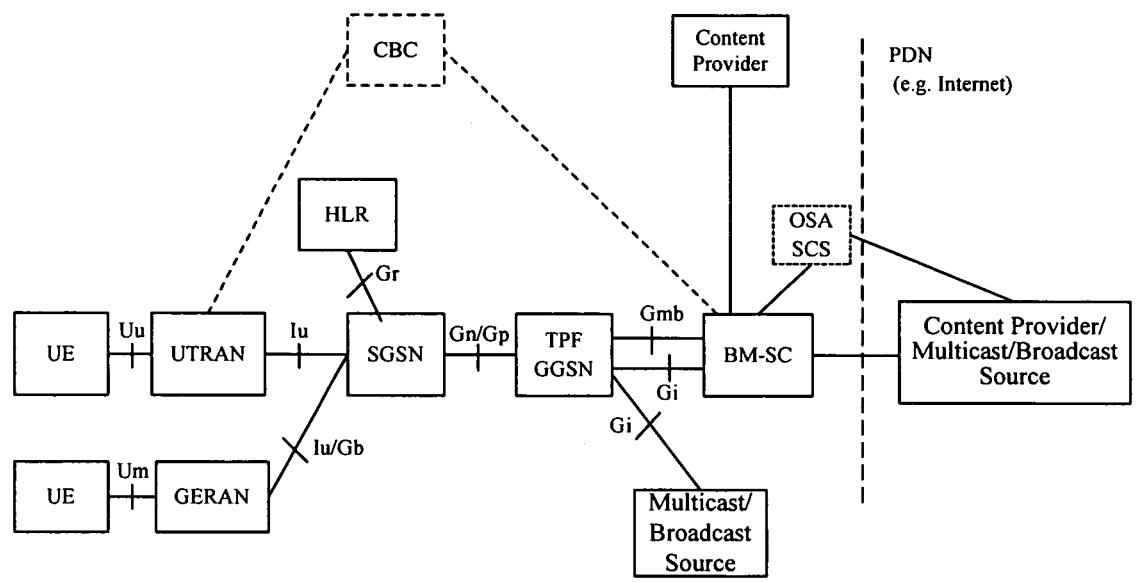
FIG. 1 is a schematic diagram illustrating the structure of a radio network supporting multicast/broadcast services.
Figure 2A:
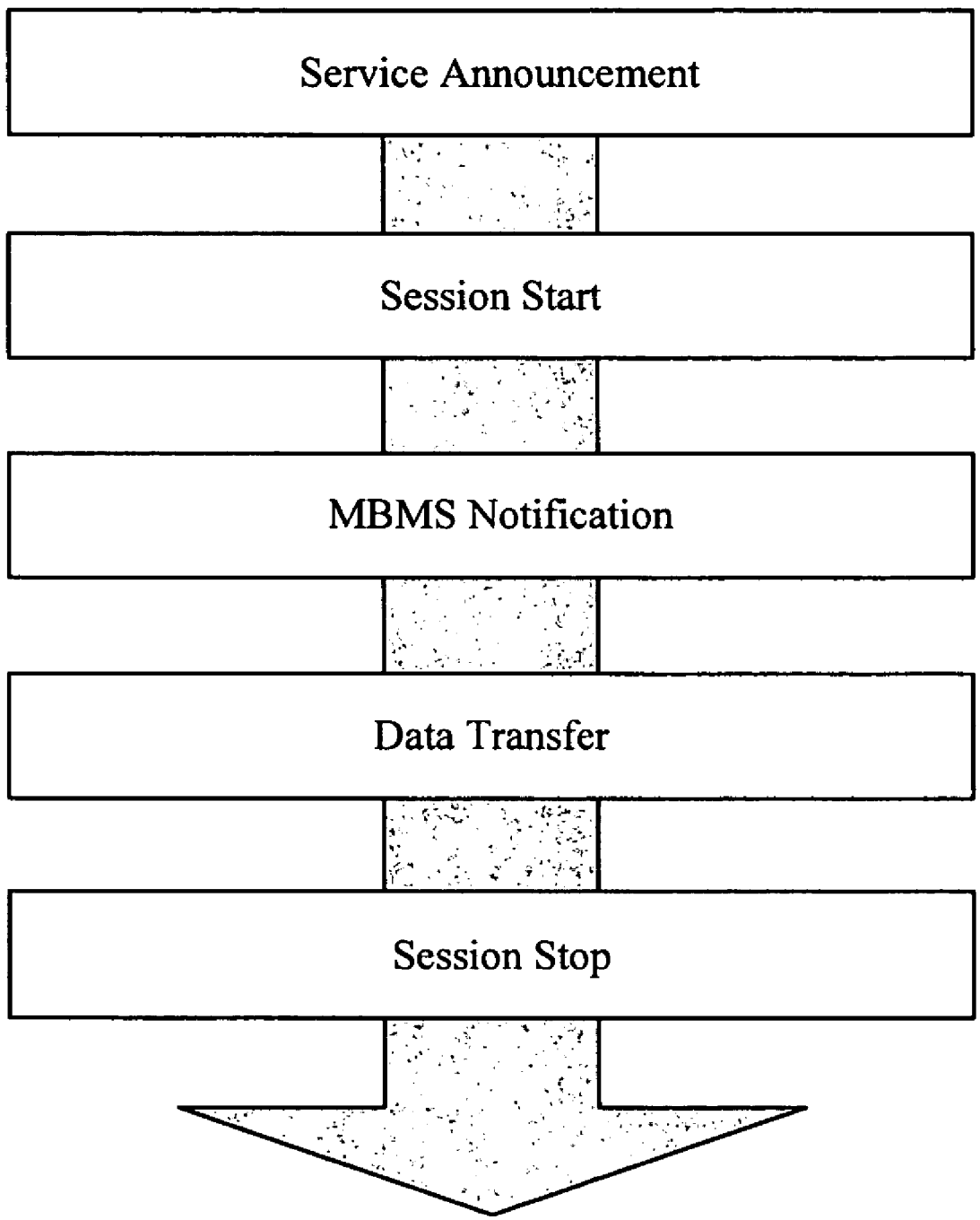
FIG. 2a is a flowchart of the whole procedure of UE receiving a broadcast service.
Figure 2B:
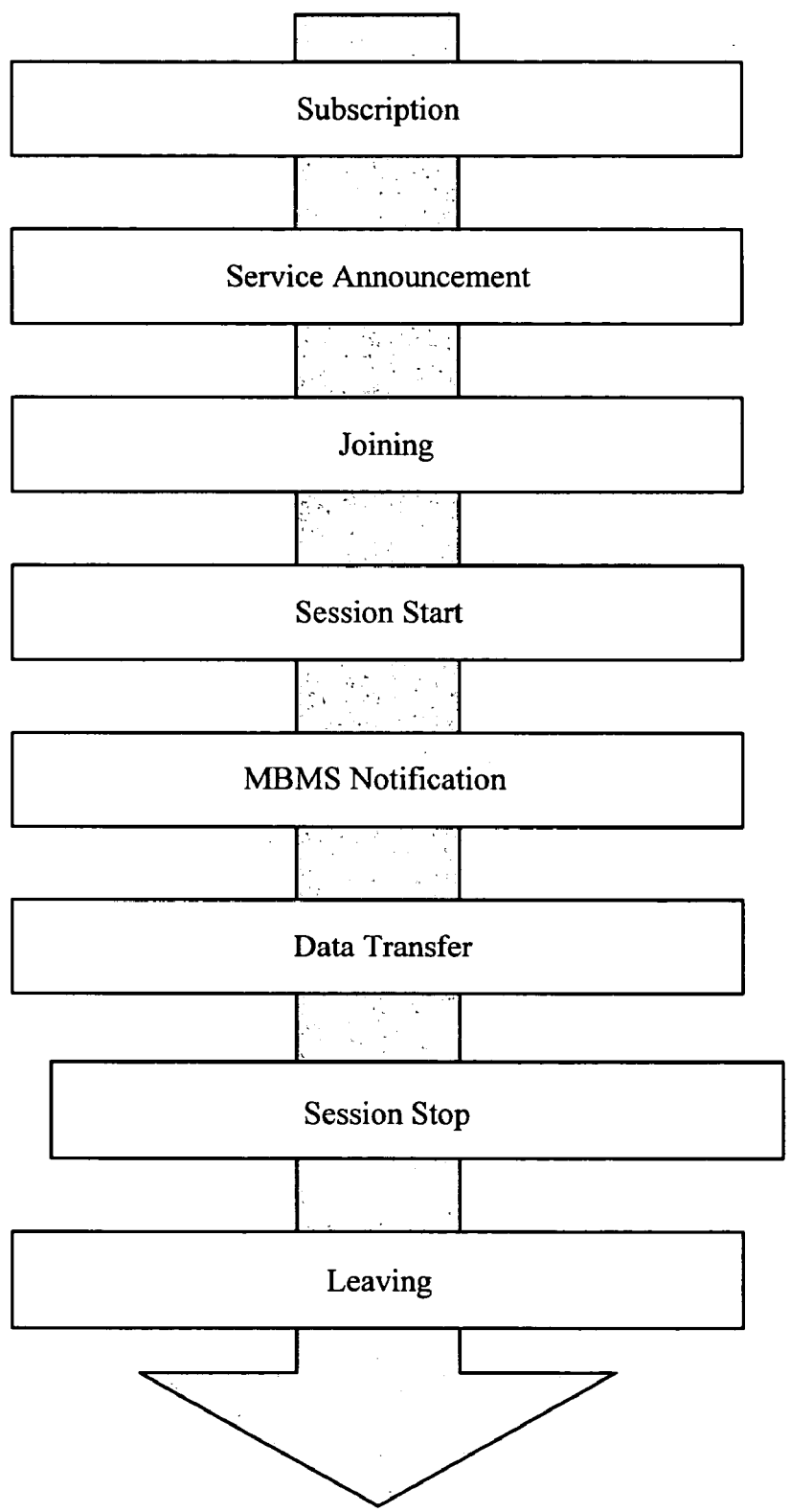
FIG. 2b is a flowchart of the whole procedure of UE receiving a multicast service.
Figure 3:
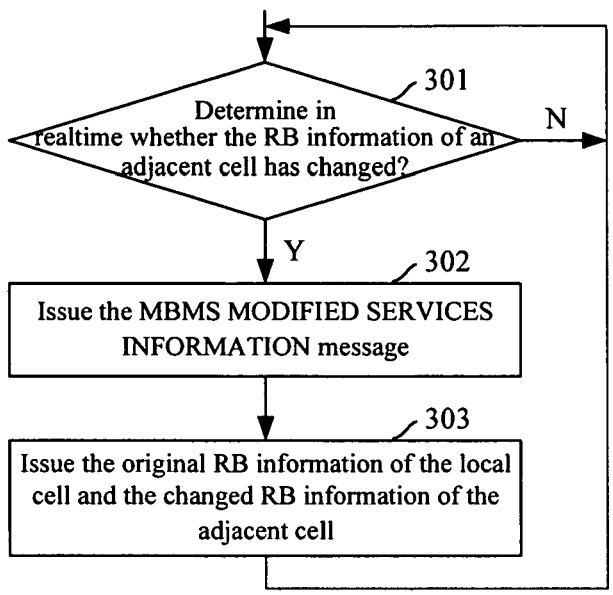
FIG. 3 is a schematic flowchart of the procedure of the UE demodulating the RB information triggered by the change in the RB information of the adjacent cell according to the first preferred embodiment of this invention.

Refer to FIG. 3, which is the flowchart of the first preferred embodiment of the invention for notifying UE of the change of the RB information in the adjacent cell to trigger UE demodulating the RB information. The procedure thereof comprises the following three steps:

Step 301: the BSC/RNC acquires the RB information of the adjacent cells in real time and determines whether the information has changed, if it has changed, goes to step 302; otherwise, repeats this step. In this embodiment, the method for acquiring the RB information of the adjacent cells is the same as in the prior art.

Step 302: the BSC/RNC carries the service identity (ID) in the instruction message, e.g. the MMSI message issued via MICH and MCCH, notifying the UE that the RB information changes.

Step 303: the BSC/RNC sends the original RB information of the local cell and the changed RB information of the adjacent cell to the UE via MCCH, and then returns to step 301.

In this way, this embodiment makes it possible to trigger the UE demodulating the RB information not only when the RB information of the local cell changes but also when the RB information of the adjacent cell changes so as to ensure that the UE has correct RB information of both the local and adjacent cells at any time.

Embodiment 2

In this embodiment, not only a processing program is added to the BSC/RNC at the network side for triggering the UE demodulating the RB information in case the RB information of the adjacent cell has changed, but modification is made to the procedure in the prior art for triggering the UE demodulating the RB information in case the RB information of the local cell has changed, description of which will be given hereinafter, respectively.

Figure 4:
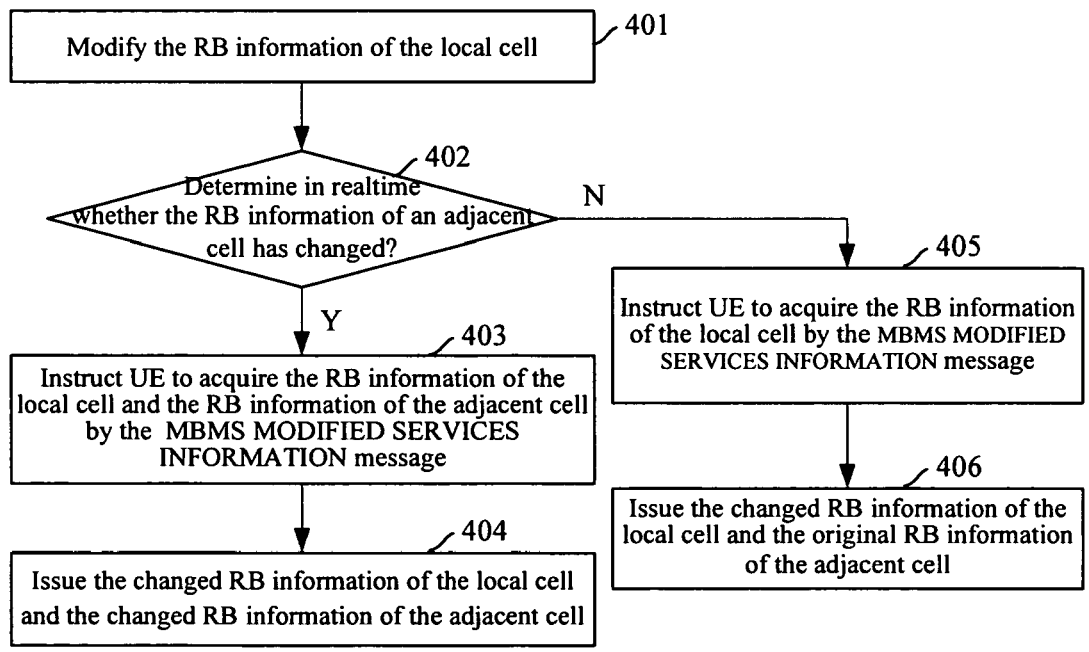
FIG. 4 is a schematic flowchart of the procedure of the UE demodulating the RB information triggered by the change in the RB information of the local cell according to the second preferred embodiment of this invention.

Refer to FIG. 4, which is the flowchart of the second preferred embodiment of the invention for notifying the UE of the change in the RB information of the local cell to trigger the UE demodulating the RB information. The procedure thereof comprises the steps of:

Step 401: the BSC/RNC modifies the RB information of the local cell.

Step 402: the BSC/RNC determines whether the RB information of the adjacent cell has changed, if changed, goes to step 403; otherwise, goes to step 405. In this embodiment, the BSC/RNC also acquires the RB information of the adjacent cell by the method in the prior art.

Step 403: the BSC/RNC carries the service ID and the operation instruction for UE in the instruction message, e.g. MMSI message issued via MICH and MCCH.

The operation instruction for UE herein may be presented in two modes:

First mode: the operation instruction for UE is presented as: acquire only the RB information of the local cell, acquire only the RB information of the adjacent cell, and acquire both the RB information of the local cell and the RB information of the adjacent cell.

Second mode: the operation instruction for UE is presented as: acquire only the changed common RB information of the local cell and/or the adjacent cell, acquire only the changed uncommon RB information of the local cell and/or the adjacent cell, and acquire both the changed common and uncommon RB information of the local cell and/or the adjacent cell.

In this embodiment, the operation instruction for UE is presented in the first mode, thus this step comprises giving the instruction of acquiring the RB information of both the local cell and the adjacent cell. If the operation instruction for UE is presented in the second mode, it is needed to determine further whether the common RB information of the local cell and/or the adjacent cell has changed, or the uncommon RB information of the local cell and/or the adjacent cell has changed, or both the common RB information and the uncommon RB information of the local cell and/or the adjacent cell has changed, and then, according to the judgment result, give in this step the instruction of acquiring only the changed common RB information of the local cell and/or the adjacent cell, or acquiring only the changed uncommon RB information of the local cell and/or the adjacent cell, or acquiring both the changed common and changed uncommon RB information of the local cell and/or the adjacent cell.

Step 404: the BSC/RNC issues the changed RB information of the local cell and the changed RB information of the adjacent cell to the UE via MCCH, and returns to step 401.

Step 405: the BSC/RNC carries the service ID and the operation-instruction for UE in the instruction message, e.g. MMSI message issued via MICH and MCCH.

As the operation instruction for UE is presented in the first mode in this embodiment, the operation instruction given in this step comprises acquiring only the RB information of the local cell.

Step 406: the BSC/RNC issues the changed RB information of the local cell and the original RB information of the adjacent cell to the UE via MCCH.

The order by which MCCH issues RB information in this embodiment is shown in Table 1.

TABLE 1

| Instruction message | | RB information of local cell | | RB information of adjacent cell | |
|---|---|---|---|---|---|
| service ID | Operation instruction for UE | Common information | Uncommon information | Common information | Uncommon information |

In fact, every kind of information of MCCH carries an identifier. In this way, the UE is able to demodulate MCCH based on the service ID and capture the required RB information according to the operation instruction for UE and the information identifier.

Figure 5:
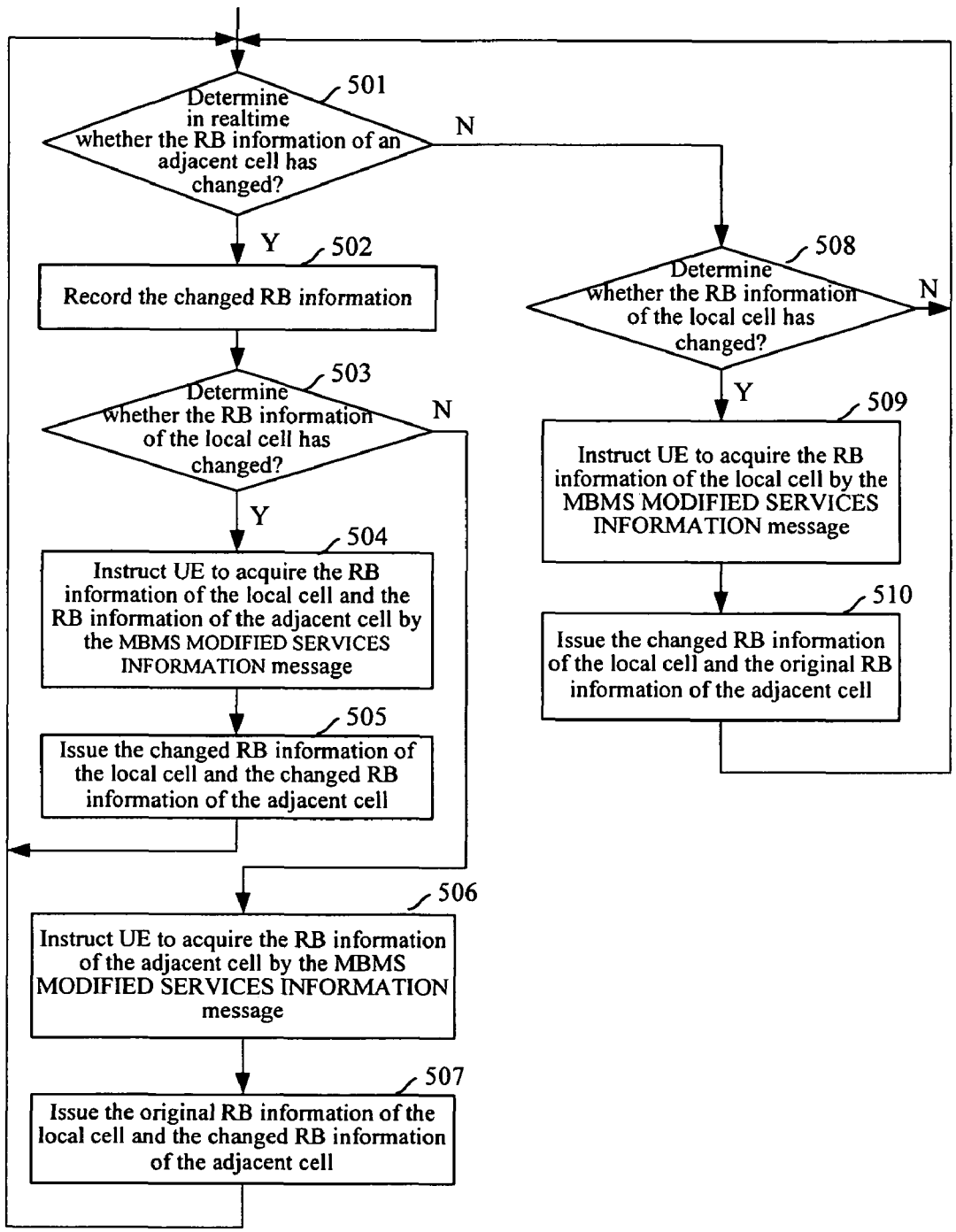
FIG. 5 is a schematic flowchart of the procedure of UE demodulating the RB information triggered by the change in the RB information of the adjacent cell according to the embodiment shown in FIG. 4.

FIG. 5 is the flowchart of the embodiment shown in FIG. 4 for notifying UE of the change of the RB information in the adjacent cell to trigger UE demodulating the RB information. The procedure thereof comprises the steps of:

Step 501: the BSC/RNC acquires the RB information of the adjacent cell in real time and determines whether this information has changed, if it has changed, goes to step 502; otherwise, goes to step 508.

Step 502: the BSC/RNC records the changed RB information of the adjacent cell.

Step 503: the BSC/RNC determines whether the RB information of the local cell has changed, if changed, goes to step 504; otherwise, goes to step 506.

Step 504: the BSC/RNC carries the service ID and the operation instruction for UE in the instruction message, e.g. MMSI message issued via MICH and MCCH.

As the operation instruction for UE is presented in the first mode in this embodiment, the operation instruction given in this step comprises acquiring both the RB information of the local cell and the RB information of the adjacent cell at the same time.

Step 505: the BSC/RNC issues the changed RB information of the local cell and the changed RB information of the adjacent cell to the UE via MCCH, and returns to step 501.

Step 506: the BSC/RNC carries the service ID and the operation instruction for UE in the instruction message, e.g. MMSI message issued via MICH and MCCH.

As the operation instruction for UE is presented in the first mode in this embodiment, the operation instruction given in this step comprises acquiring only the RB information of the adjacent cell.

Step 507: the BSC/RNC issues the original RB information of the local cell and the changed RB information of the adjacent cell to the UE via MCCH and returns to step 501.

Step 508: the BSC/RNC determines whether the RB information of the local cell has changed, if changed, goes to step 509; otherwise, returns to step 501.

Step 509: the BSC/RNC carries the service ID and the operation instruction for UE in the instruction message, e.g. MMSI message issued via MICH and MCCH.

As the operation instruction for UE is presented in the first mode in this embodiment, the operation instruction given in this step comprises acquiring only the RB information of the local cell.

Step 510: the BSC/RNC issues the changed RB information of the local cell and the original RB information of the adjacent cell to the UE via MCCH and returns to step 501.

In the above embodiments, the local cell will notify the UEs in the local cell of the service configuration information of the adjacent cell even if the information of the adjacent cell remains unchanged.

The above embodiments are described by taking RB information as an example. In practical applications, the method is applicable to other types of cell information, which is not to be described again.

It can be seen from the foregoing embodiments that the method in accordance with this invention ensures that the UE has correct cell information at any time, even when the UE moves to the border of two adjacent cells.

To sum up, the above description is only preferred embodiments of this invention and is not to be construed as limiting the protection scope thereof.

The invention claimed is:

1. A method for providing an indication of radio bearer information change to a User Equipment (UE) in a multimedia broadcast/multicast service (MBMS), wherein the UE is located in a local cell and one or more other cells are adjacent to the local cell, the method comprising:

acquiring, by a Base Station Controller/Radio Network Controller (BSC/RNC), radio bearer information of the local cell, and acquiring, by the BSC/RNC, radio bearer information of an adjacent cell in real time;

determining whether the radio bearer information of the adjacent cell has changed relative to a prior set of radio bearer information of the adjacent cell;

if the radio bearer information of the adjacent cell has changed, determining, by the BSC/RNC, whether radio bearer information of the local cell has also changed relative to a prior set of radio bearer information of the local cell; and if the radio bearer information of the local cell has not changed, selecting an operation instruction for the UE that is presented in two modes;

wherein the selecting an operation instruction for a first mode comprises:

(a) sending, by the BSC/RNC, service information and an operation instruction to the UE via a control channel; wherein the operation instruction instructs the UE to acquire the radio bearer information of only the adjacent cell; and issuing, by the BSC/RNC, the radio bearer information of the local cell and the changed radio bearer information of the adjacent cell to the UE, and wherein the selecting an operation instruction for a second mode comprises:

(b) determining, by the BSC/RNC, which subset of the radio bearer information of the adjacent cell has changed, sending, by the BSC/RNC, service information and an operation instruction to the UE via a control channel; wherein the operation instruction instructs the UE to acquire the changed subset of the radio bearer information of the adjacent cell; and issuing, by the BSC/RNC, the radio bearer information of the local cell and the changed radio bearer information of the adjacent cell to the UE;

wherein the radio bearer information of the adjacent cell is divided into two subsets: common information of the adjacent cell and uncommon information of the adjacent cell.

2. The method according to claim 1, wherein
the control channel is one of a MBMS notification indicator channel (MICH) and a MBMS control channel (MCCH); and
the operation instruction is in a MBMS MODIFIED SERVICES INFORMATION message.

3. The method according to claim 1, wherein the service information comprises a service identity of the MBMS service.

4. The method according to claim 1, wherein the acquiring the radio bearer information of the adjacent cell comprises:
acquiring, by the BSC/RNC, the radio bearer information of the adjacent cell from a serving GPRS support node (SGSN).

5. The method according to claim 1, further comprising:
notifying, by the local cell, the UE about service configuration information of the adjacent cell when there is no change in the radio bearer information of the adjacent cell.

6. A multimedia broadcast/multicast service (MBMS) system, comprising a User Equipment (UE) located in a local cell and a Base Station Controller/Radio Network Controller (BSC/RNC), wherein one or more other cells are adjacent to the local cell, and wherein:
the UE is configured to acquire radio bearer information of an adjacent cell in response to an operation instruction indicating a change in radio bearer information of the adjacent cell;
the BSC/RNC is configured to: acquire radio bearer information of the local cell, acquire radio bearer information of the adjacent cell in real time, and determine whether the radio bearer information of the adjacent cell has changed relative to a prior set of radio bearer information of the adjacent cell; and
if the radio bearer information of the adjacent cell has changed, the BSC/RNC is further configured to determine whether radio bearer information of the local cell has also changed relative to a prior set of radio bearer information of the local cell;
if the radio bearer information of the local cell has not changed, the BSC/RNC is further configured to select an operation instruction for the UE that is presented in two modes;
wherein the selecting an operation instruction for a first mode comprises:
(a) send service information and an operation instruction to the UE via a control channel, wherein the operation instruction instructs the UE to acquire the radio bearer information of only the adjacent cell; and issue the radio bearer information of the local cell and the changed radio bearer information of the adjacent cell to the UE, and
wherein the selecting an operation instruction for a second mode comprises:
(b) determine which subset of the radio nearer information has changed, wherein the radio bearer information of the adjacent cell is divided into two subsets: common information of the adjacent cell and uncommon information of the adjacent cell; send service information and an operation instruction to the UE via a control channel, wherein the operation instruction instructs the UE to acquire a changed subset of the radio bearer information of the adjacent cell; and issue the radio bearer information of the local cell and the changed radio bearer information of the adjacent cell to the UE.

7. The MBMS system according to claim 6, wherein the BSC/RNC is further configured to acquire the radio bearer information of the adjacent cell from a serving GPRS support node (SGSN).

8. The MBMS system according to claim 6, wherein the UE is further configured to receive from the local cell about service configuration information of the adjacent cell when there is no change in the radio bearer information of the adjacent cell.

9. The method according to claim 1, wherein the radio bearer information is radio bearer information of the MBMS service.

10. The method according to claim 9, wherein the radio bearer information comprises information on radio bearer configuration and information on radio bearer mapping.

11. The MBMS system according to claim 6, wherein the radio bearer information is radio bearer information of the MBMS service.

12. The MBMS system according to claim 11, wherein the radio bearer information comprises information on radio bearer configuration and information on radio bearer mapping.

* * * * *